United States Patent
Hamilton, II et al.

(10) Patent No.: US 9,244,513 B2
(45) Date of Patent: Jan. 26, 2016

(54) REDUCTION OF COMPUTER RESOURCE USE IN A VIRTUAL UNIVERSE

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 2090 days.

(21) Appl. No.: 12/259,523

(22) Filed: Oct. 28, 2008

(65) Prior Publication Data

US 2010/0107084 A1    Apr. 29, 2010

(51) Int. Cl.
*G06F 3/048* (2013.01)
*G06F 1/32* (2006.01)
*G06F 3/01* (2006.01)

(52) U.S. Cl.
CPC .............. *G06F 1/3203* (2013.01); *G06F 3/011* (2013.01)

(58) Field of Classification Search
USPC ........................................................... 715/757
See application file for complete search history.

(56) References Cited

U.S. PATENT DOCUMENTS

| | | | |
|---|---|---|---|
| 7,293,235 B1 | 11/2007 | Powers et al. | |
| 2005/0044436 A1* | 2/2005 | Holle | 713/320 |
| 2007/0050715 A1 | 3/2007 | Behar | |
| 2007/0106769 A1 | 5/2007 | Liu | |
| 2007/0168863 A1* | 7/2007 | Blattner et al. | 715/706 |

* cited by examiner

*Primary Examiner* — Angie Badawi
(74) *Attorney, Agent, or Firm* — Douglas A. Lashmit; Hoffman Warnick LLC

(57) ABSTRACT

The invention provides a method, system, and program product for reducing use of one or more computer resources. In one embodiment, the invention includes monitoring a user's interaction with a virtual universe, determining whether the user's interaction with the virtual universe is consistent with the user's attention being diverted from the virtual universe, determining whether a computer resource allocated to the user should be reduced, and in the case that the computer resource should be reduced, reducing the computer resource.

17 Claims, 5 Drawing Sheets

REDUCTION OF COMPUTER RESOURCE USE IN A VIRTUAL UNIVERSE

TECHNICAL FIELD

The invention relates generally to virtual universes (VUs) and, more particularly, to the reduction of a computer resource allocated to a user based on the user's interaction with a VU.

BACKGROUND OF THE INVENTION

A virtual universe (VU) is a computer-based simulated environment intended for its residents to traverse, inhabit, and interact through the use of avatars. Many VUs are represented using 3-D graphics and landscapes, and are populated by many thousands of users, known as "residents."

VUs have become more complex as processing power, memory storage, and bandwidth have increased. Likewise, opportunities for multi-avatar events such as business meetings, lectures, and social gatherings have increased. Residents or participants in the VUs find that demands on their time are comparable in many ways to time demands in the real world. Thus, a real-world resident who is also a VU resident may find that he or she is obligated to attend to business in the real world which occurs simultaneously with one or more events in the VU. While a person attends to business in the real world, the computing resources of the VU are used unnecessarily to maintain the details of the form and appearance of a user's avatar or another object in the VU. A method is needed to reduce the computing resources required to maintain the avatar or other object while the owner is attending to other business.

SUMMARY OF THE INVENTION

The invention provides a method, system, and program product for reducing use of one or more computer resources.

One aspect of the invention provides a method of reducing use of a computer resource, the method comprising: monitoring a user's interaction with a virtual universe; determining whether the user's interaction with the virtual universe is consistent with the user's attention being diverted from the virtual universe; determining whether a computer resource allocated to the user should be reduced; and in the case that the computer resource should be reduced, reducing the computer resource.

Another aspect of the invention provides a system for reducing use of a computer resource, the system comprising: a system for monitoring a user's interaction with a virtual universe; a system for determining whether the user's interaction with the virtual universe is consistent with the user's attention being diverted from the virtual universe; a system for determining whether a computer resource allocated to the user should be reduced; and a system for reducing the computer resource.

Still another aspect of the invention provides a program product stored on a computer-readable medium, which when executed, reduces use of a computer resource, the program product comprising: program code for monitoring a user's interaction with a virtual universe; program code for determining whether the user's interaction with the virtual universe is consistent with the user's attention being diverted from the virtual universe; program code for determining whether a computer resource allocated to the user should be reduced; and program code for reducing the computer resource.

Yet another aspect of the invention provides a method for deploying an application for reducing use of a computer resource, comprising: providing a computer infrastructure being operable to: monitor a user's interaction with a virtual universe; determine whether the user's interaction with the virtual universe is consistent with the user's attention being diverted from the virtual universe; determine whether a computer resource allocated to the user should be reduced; and reduce the computer resource.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, "virtual universe" is meant to be interchangeable with "virtual world" and similar terms and phrases known to one skilled in the art. Virtual universes include, without limitation, Second Life®, Entropia Universe®, The Sims Online™, There, Red Light Center, EverQuest®, Ultima® Online™, Lineage, and World of Warcraft®.

Figure 1:
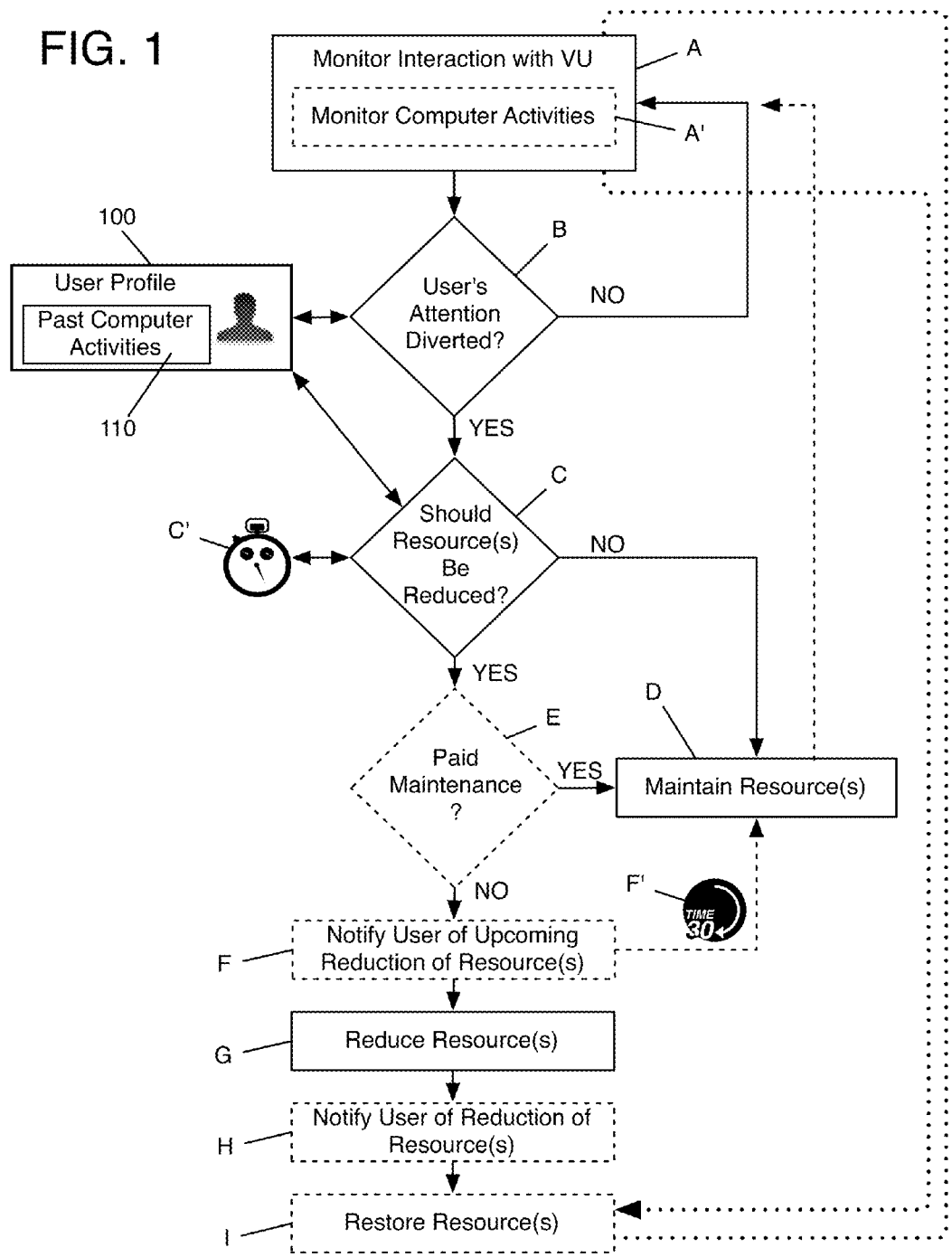
FIG. 1 shows a flow diagram of an illustrative method according to the invention.

Turning now to the drawings, FIG. 1 shows a flow diagram of an illustrative method according to the invention. At A, a user's interaction with the virtual universe (VU) is monitored. That is, the activity of the user's avatar or other entity or object over which the user may exert control, is monitored.

In some embodiments, monitoring the user's interaction with the VU may include monitoring the user's computer activities A', specifically, the user's computer activities unrelated to the application or applications used to interact with the VU. For example, if a user's avatar has been idle within the VU for some period, it is possible that the user is waiting for the arrival of another avatar or the occurrence of some event. However, if it is determined that the user is actively using another computer application (e.g., electronic mail application, instant messaging application, Web browser, word processor, voice-over-Internet-protocol (VOIP) or other telephonic communication system accessible to a computer, etc.), it may also be the case that the user's attention has been diverted from the VU. In such a situation, computer resources allocated to the user's activities within the VU are being wasted with respect to the user and may be more efficiently allocated elsewhere or simply conserved.

As used herein, "computer resource" means any finite resource that may be allocated to a user in connection with the user's interaction with the VU. Non-limiting examples of computer resources include central processing unit (CPU) usage, disk usage, network usage, memory usage, and software usage.

At B, it is determined whether a user's attention has been diverted from the VU. Making such a determination may include, for example, examining the user's profile 100, which may include a record of past computer activities 110. If, for example, monitoring of the user's computer activities at A' indicates that the user is engaged in a phone call with someone at a particular phone number, examination of the user's past computer activities 110 may reveal that, historically, the user has continued to interact with the VU during phone conversations with individuals a that phone number. In such a case, it may be determined, at least initially, that the user's attention to the VU has not been diverted (i.e., NO at B). Flow may then return to A, whereupon whether the user's attention has been diverted from the VU may be iteratively redetermined. That is, while an initial determination may be that the user's attention has not been diverted, a change in computer activities and/or protracted lack of interaction with the VU may result in a subsequent determination that the user's attention has, in fact, been diverted from the VU.

If it is determined that the user's attention has been diverted from the VU (i.e., YES at B), it is determined at C whether one or more computer resources allocated to the user should be reduced. Of particular interest in determining whether resources should be reduced includes, for example, data related to the typical time the user devotes to a particular computer activity. For example, if the user's past computer activities 110 indicate that, once accessed, the user typically spends 60 minutes using an instant messaging application, it may well be the case that computer resources allocated to the user should be reduced when, as described above, the user's interaction with the VU has been idled and monitoring of the user's computer activities A' indicates that the user is using the instant messaging application.

On the other hand, if the user's interaction with the VU has been idled but both the user's current and past computer activities 110 suggest that the idled interaction will be brief (e.g., the user is employing his or her electronic mail application, which typically lasts 10 minutes or less), there may be little or no value in reducing the computer resources allocated to the user.

As shown in FIG. 1 and as described above, there may be a temporal component C' to determining whether a computer resource should be reduced. That is, in some embodiments, the determination is not made until the user's interaction with the VU has been idled for some pre-determined period (e.g., 10 minutes). In addition, the length of idling may be compared to the user profile 100 and/or the user's past computer activities 110 to predict whether such idling is likely to continue for a period sufficient to merit reducing one or more computer resources allocated to the user.

Similarly, it may be the case that the user's interaction with the VU has been idled and the user has not engaged in any other computer activities during the period of idling, suggesting that the user is away from the computer. In such a case, it may be determined at C that resources allocated to the user should be reduced. This determination may be made by comparing the period of idling to the user's profile 100 and/or past computer activities 110 or without such comparison. Such comparison may be deemed unnecessary, for example, if the period of idling is longer than a pre-determined period (e.g., 30 minutes).

If it is determined that one or more computer resources allocated to the user cannot or should not be reduced (i.e., NO at C), the resources allocated to the user are maintained at D. This may occur, for example, if the period of idling and other computer activities suggest that the user will again interact with the VU within a period not meriting a reduction in allocated computer resources. Flow may then optionally return to A, such that monitoring of the user's interaction with the VU continues, with subsequent determinations at B and C, respectively, as to whether the user's attention has been diverted and, if so, whether one or more resources should be reduced.

If it is determined that one or more computer resources allocated to the user should be reduced (i.e., YES at C), it may optionally be determined at E whether the user has paid or otherwise made arrangements for such resources not to be reduced. That is, a user may be offered the option of maintaining the computer resources allocated to him or her even in the case that the user's interaction with the VU is idled and would otherwise constitute a waste of resources. For example, a user may agree to be billed or otherwise charged for his or her use of resources that might be considered wasted. Such charges may be monetary (e.g., the user is charged X dollars per hour that resources are wasted or per unit of wasted resources), non-monetary (e.g., the user is charged against a monthly allotment of wasted resources), or some combination thereof (e.g., the user is charged or required to purchase carbon credits, which may be auctioned, traded, sold, or given to other members of the VU).

If the user has paid or otherwise arranged for computer resources not to be reduced (i.e., YES at E), the resources are maintained at D. If the user has not made such arrangements (i.e., NO at E), the user may optionally be notified of an upcoming reduction in resources at F. For example, a pop-up window or other notification on the user's computer may be used. The user may then be given a period F' within which to override the reduction of resources. If the user makes such an override, the resources are maintained at D.

One or more computer resources are reduced at G. The particular way in which a resource is reduced depends, of course, on what the resource is. The degree of reduction depends, too, on the particular resource, but may also depend on the period of idleness and/or the user's past computer activities. In some cases, for example, the reduction of resources may be complete (i.e., the user is logged out of the application by which he or she accessed the VU and the user's avatar or other entity or object within the user's control is removed from the VU). Alternatively, there may merely be a reduction in the number of computer cycles allotted to the user.

Various other methods of reducing a computer resource allocated to the user are possible. Non-limiting examples include changing the representation of the user's avatar from color to black and white, reducing the size of the user's avatar, reducing the resolution of the user's avatar, or replacing the user's avatar with a two-dimensional representation. It should be recognized, of course, that similar methods may be employed with respect to non-avatar entities or objects within the VU.

At H, the user may optionally be notified that one or more resources allocated to him or her has been reduced. Again, this may be accomplished in any number of ways. In some embodiments, a pop-up window or other message or graphic may be displayed on the user's computer, cellular phone, personal digital assistant, watch, or other device. In other embodiments, the user may be contacted (e.g., via electronic mail, instant messaging, etc.) directly and informed of the reduction.

In one particular embodiment, the user may be notified of the reduction in one or more resources by replacing the user's avatar with an avatar screen saver, whereby the user's avatar is altered in some recognizable way (e.g., being converted from a three-dimensional representation to a two-dimensional representation). In some embodiments, the avatar screen saver is applied only to the user's view of the VU, such that the representation of the avatar in the VU is unchanged or differently changed (e.g., is altered as described above or removed from the VU entirely). In some embodiments, the avatar screen saver is managed solely by the user's client computing device and not the VU server computer.

Finally, the resource(s) reduced at G may optionally be restored at I. Such restoration may be made automatically based on continued monitoring of the user's interaction with the VU A and/or computer activities A'. Alternatively, such restoration may require some explicit action by the user, such as responding to a notification made at H or relaunching an application by which the user interacts with the VU.

Figure 2:
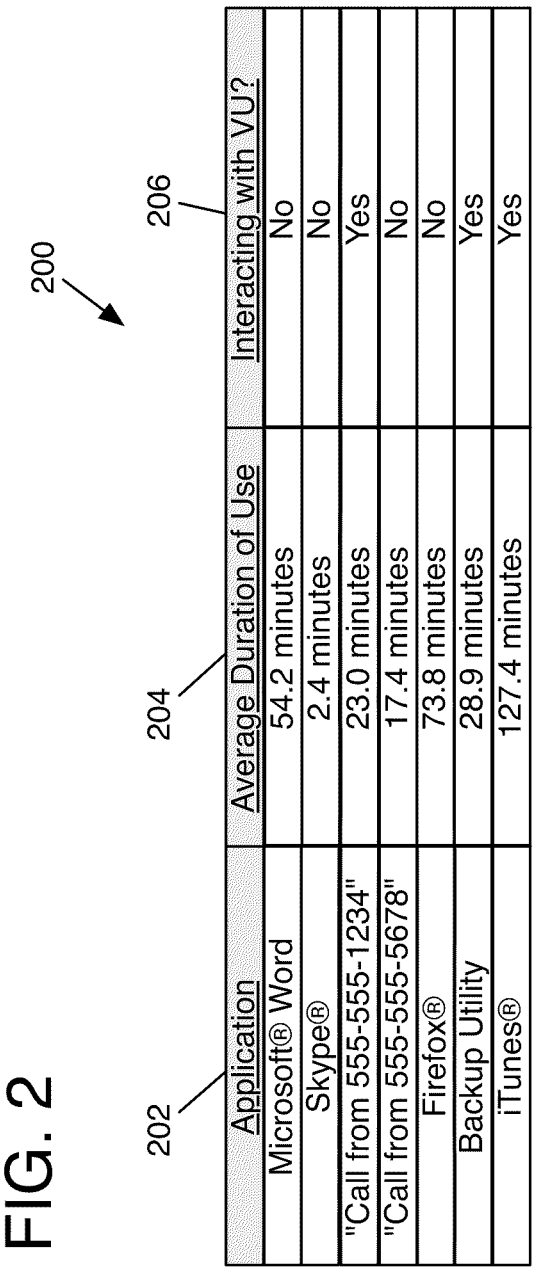
FIG. 2 shows a table of data useful in determining whether a user's attention has been diverted from a virtual universe and/or whether a computer resource allocated to the user should be reduced.

FIG. 2 shows a table 200 containing data related to the user's past computer activities, such as may be used to determine whether a user's attention has been diverted (B in FIG. 1) or resource(s) allotted to the user should be reduced (C in FIG. 1). As shown in FIG. 2, the table 200 includes columns of data related to computer applications 202, average durations of use 204 of such applications, and whether the user interacts with the VU 206 while using such applications.

For example, the table 200 indicates that, on average, the duration of the user's use of Microsoft® Word is 54.2 minutes and, during that use, the user is not interacting with the VU. In the case, then, that monitoring the user's computer activities (A' in FIG. 1) indicates that the user is using the Microsoft® Word application, it may be determined that the user's attention has been diverted from the VU (YES at B in FIG. 1) and that one or more resources allocated to the user should be reduced (YES at C in FIG. 1). As noted above, determining whether a resource should be reduced may include consideration of a temporal component (C' in FIG. 1).

On the other hand, the table 200 indicates that, on average, the duration of the user's use of Skype® is 2.4 minutes. While the user does not interact with the VU during his or her use of Skype®, the relatively short duration of use may indicate that little or no benefit would be obtained by reducing a resource allocated to the user.

With continuing reference to FIG. 2, the table 200 indicates that, on average, calls from 555-555-1234 last 23.0 minutes, during which the user is interacting with the VU, while calls from 555-555-5678 last 17.4 minutes, during which the user is not interacting with the VU. Thus, while a call from 555-555-1234, on average, lasts longer than a call from 555-555-5678, it may be the case that a resource should be reduced during a call from 555-555-5678 but not during a call from 555-555-1234. Again, as noted above, determining whether a resource should be reduced may include consideration of a temporal component. For example, it may be that a resource will not be reduced until a user has been on a call for at least one quarter of its average duration. Other criteria and combinations of criteria will be known to one skilled in the art.

Figure 3:
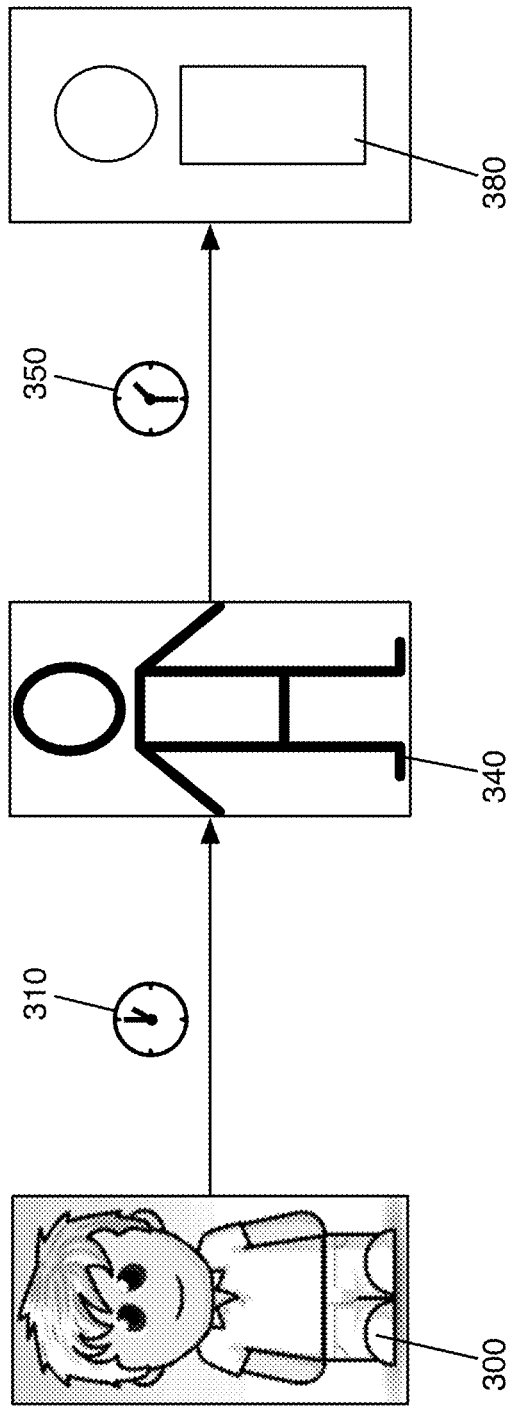
FIGS. 3A-C shows a reduction in the resolution of an avatar according to an illustrative embodiment of the invention.

FIGS. 3A-C show the reduction in resolution of an avatar according to one embodiment of the invention. Initially, as shown in FIG. 3A, the avatar 300 is shown in full resolution, as may be the case when a user is interacting with the VU. After a period 310 of inactivity, resolution of the avatar is reduced, as shown in FIG. 3B, such that a two-dimensional avatar 340 is substituted. Following an additional period 350 of inactivity, resolution of the avatar may be further reduced, as shown in FIG. 3C, such that a geometric avatar 380 is substituted.

Variations of such a reduction in resolution are possible, of course, as will be recognized by one skilled in the art. For example, in the case that a user's inactivity continues, the avatar's presence in the VU may be discontinued entirely. In other cases, the initial reduction in resolution may be to a geometric shape (i.e., substitution of the two-dimensional avatar 340 is forgone). As noted above, such reductions in resolution or other reduction in resources may be applied to any object or entity within the VU and are not limited to avatars.

Figure 4:
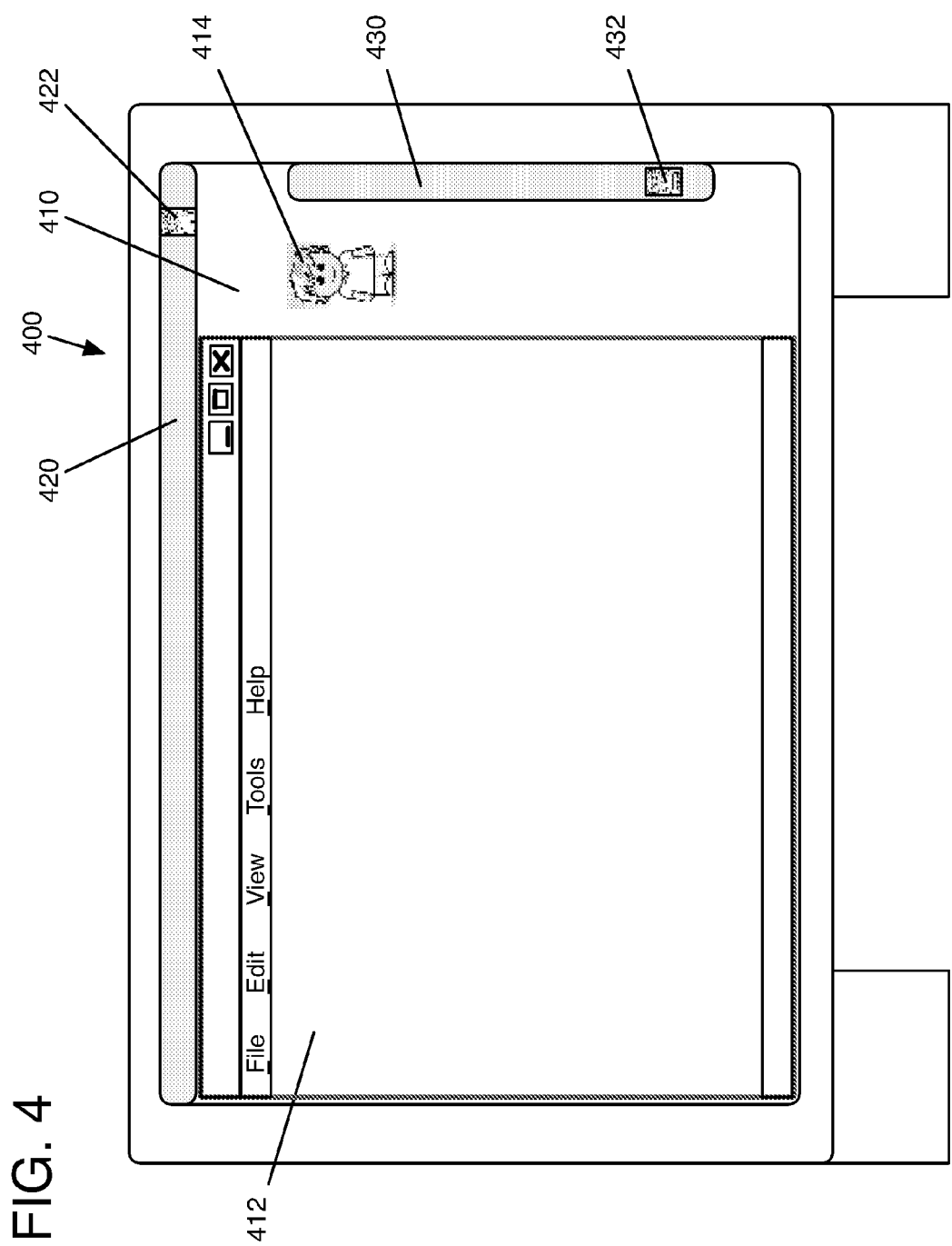
FIG. 4 shows a display containing various notifications to a user that one or more resources has been reduced.

FIG. 4 shows a display 400, upon which a user may be notified of a reduction in resources allotted to him or her. The display 400 includes a desktop 410 containing a word processing window 412, such as may appear in the case that the user's interaction with the VU has been idled due to the user's use of a word processing application. In the case that a resource allotted to the user has been reduced, an icon or similar graphic may be included on the display 400 to notify the user of the reduction. For example, an icon 414 may be included on the desktop 410 itself. Alternatively, or in addition, a menu bar icon 422 may be included in a menu bar 420 and/or a dock icon 432 may be included in a dock 430 of the display 400.

A user may choose to "reactivate" the avatar or other object or entity by, for example, clicking on or otherwise selecting or activating such an icon. That is, a user may initiate reallocation of the reduced resource(s) via such an icon.

Figure 5:
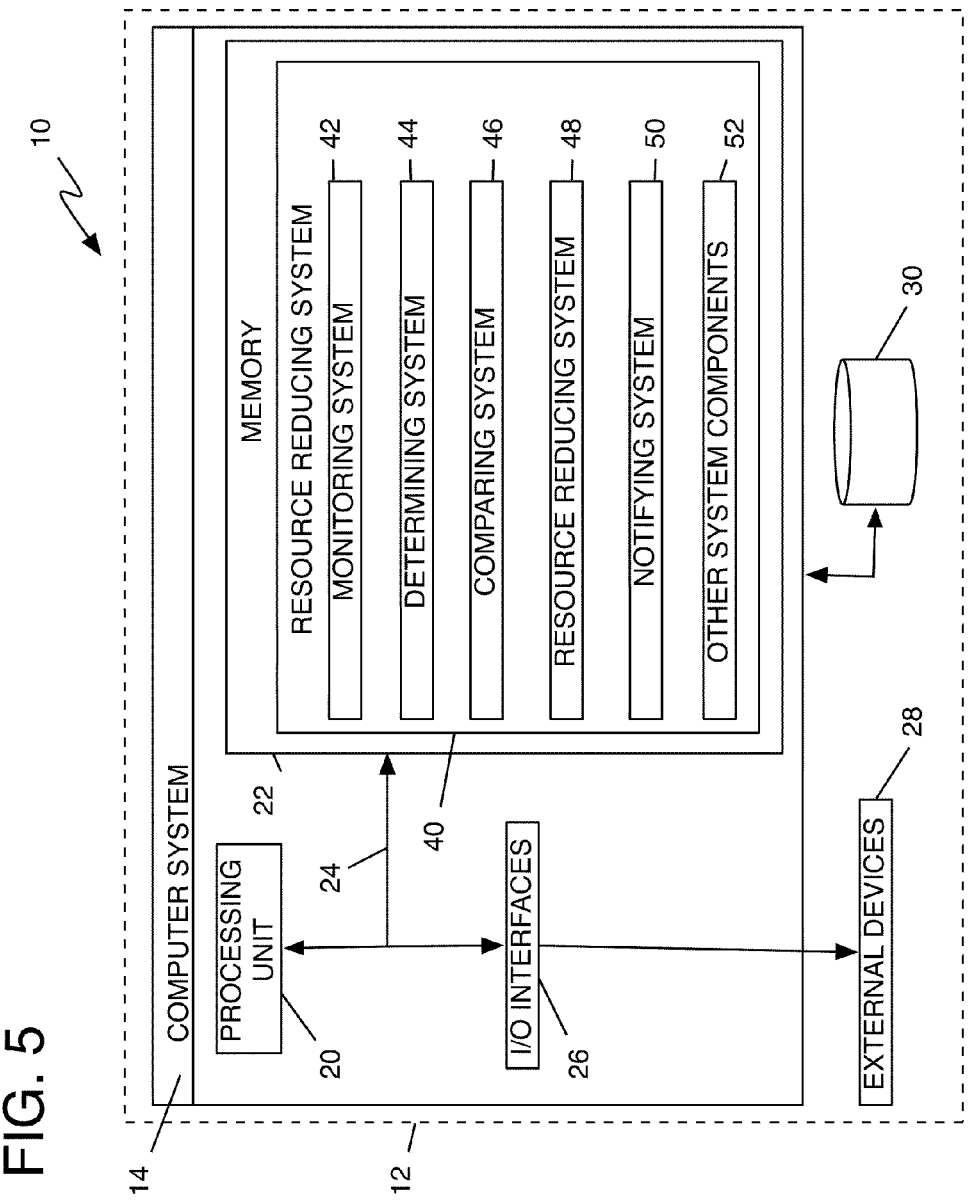
FIG. 5 shows a block diagram of an illustrative system according to the invention.

FIG. 5 shows an illustrative system 10 for reducing use of a computer resource. To this extent, system 10 includes a computer infrastructure 12 that can perform the various process steps described herein for reducing a computer resource. In particular, computer infrastructure 12 is shown including a computer system 14 that comprises a resource reducing system 40, which enables computer system 14 to reduce use of a computer resource by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as resource reducing system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and resource reducing system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the resource reducing system 40 enables the computer system 14 to reduce use of a computer resource. To this extent, the resource reducing system 40 is shown including a monitoring system 42, a determining system 44, a comparing system 46, a resource reducing system 48, and a notifying system 50. Operation of each of these systems is discussed above. The resource reducing system 40 may further include other system components 52 to provide additional or improved functionality to the resource reducing system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for reducing use of a computer resource, it is understood that the invention further provides various alternative embodiments. For example, in one embodiment, the invention provides a computer-readable medium that includes computer program code to enable a computer infrastructure to reduce use of a computer resource. To this extent, the computer-readable medium includes program code, such as resource reducing system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to reduce use of a computer resource, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for reducing use of a computer resource. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of reducing use of a computer resource, the method comprising:
   monitoring a user's interaction with a virtual universe;
   determining whether the user's interaction with the virtual universe is consistent with the user's attention being diverted from the virtual universe;
   determining whether a computer resource allocated to the user should be reduced, including determining whether the user has chosen to maintain an avatar of the user within the virtual universe by paying for such maintenance; and
   in the case that the computer resource should be reduced, reducing the computer resource by performing at least one of the following: terminating a presence of an avatar of the user within the virtual universe, changing a representation of an avatar of the user from color to black and white, reducing a size of an avatar of the user, reducing a resolution of an avatar of the user, or replacing an avatar of the user with a two-dimensional shape.

2. The method of claim 1, wherein the computer resource includes at least one resource selected from a group consisting of: central processing unit (CPU) usage, disk usage, network usage, memory usage, and software usage.

3. The method of claim 1, wherein monitoring includes monitoring computer activities of the user.

4. The method of claim 3, wherein determining whether the user's interaction with the virtual universe is consistent with the user's attention being diverted from the virtual universe includes determining whether the user's computer activities includes one or more of the following: utilization of a word processing application, utilization of a Web browser application, utilization of an electronic mail application, or utilization of a telephonic device.

5. The method of claim 3, wherein determining whether the user's interaction with the virtual universe is consistent with the user's attention being diverted from the virtual universe includes comparing the user's computer activities to the user's past computer activities.

6. The method of claim 5, wherein the user's past computer activities are included in a profile of the user's computer activities.

7. The method of claim 1, further comprising:
notifying the user that the computer resource allocated to the user will be reduced.

8. The method of claim 1, further comprising:
notifying the user that the computer resource allocated to the user has been reduced.

9. The method of claim 1, wherein reducing the computer resource includes replacing an avatar of the user with an avatar screen saver.

10. A system comprising:
at least one computing device configured for reducing use of a computer resource by performing a method comprising:
monitoring a user's interaction with a virtual universe;
determining whether the user's interaction with the virtual universe is consistent with the user's attention being diverted from the virtual universe;
determining whether a computer resource allocated to the user should be reduced, including determining whether the user has chosen to maintain an avatar of the user within the virtual universe by paying for such maintenance; and
reducing the computer resource by performing at least one of the following: terminating a presence of an avatar of the user within the virtual universe, changing a representation of an avatar of the user from color to black and white, reducing a size of an avatar of the user, reducing a resolution of an avatar of the user, or replacing an avatar of the user with a two-dimensional shape.

11. The system of claim 10, wherein the computer resource includes at least one resource selected from a group consisting of: central processing unit (CPU) usage, disk usage, network usage, memory usage, and software usage.

12. The system of claim 10, wherein the method further comprises:
monitoring computer activities of the user.

13. The system of claim 12, wherein the method further comprises:
comparing the user's computer activities to the user's past computer activities.

14. The system of claim 10, wherein reducing the computer resource is capable of replacing an avatar of the user with an avatar screen saver.

15. A program product stored on a non-transitory computer-readable storage medium, which when executed, is operable to reduce use of a computer resource by performing a method comprising:
monitoring a user's interaction with a virtual universe;
determining whether the user's interaction with the virtual universe is consistent with the user's attention being diverted from the virtual universe;
determining whether a computer resource allocated to the user should be reduced, including determining whether the user has chosen to maintain an avatar of the user within the virtual universe by paying for such maintenance; and
reducing the computer resource by performing at least one of the following: terminating a presence of an avatar of the user within the virtual universe, changing a representation of an avatar of the user from color to black and white, reducing a size of an avatar of the user, reducing a resolution of an avatar of the user, or replacing an avatar of the user with a two-dimensional shape.

16. The program product of claim 15, wherein the computer resource includes at least one resource selected from a group consisting of: central processing unit (CPU) usage, disk usage, network usage, memory usage, and software usage.

17. A method for deploying an application for reducing use of a computer resource, comprising:
providing a computer infrastructure being operable to:
monitor a user's interaction with a virtual universe;
determine whether the user's interaction with the virtual universe is consistent with the user's attention being diverted from the virtual universe;
determine whether a computer resource allocated to the user should be reduced, including determining whether the user has chosen to maintain an avatar of the user within the virtual universe by paying for such maintenance; and
reduce the computer resource by performing at least one of the following: terminating a presence of an avatar of the user within the virtual universe, changing a representation of an avatar of the user from color to black and white, reducing a size of an avatar of the user, reducing a resolution of an avatar of the user, or replacing an avatar of the user with a two-dimensional shape.

* * * * *